(12) United States Patent
Tsirkin et al.

(10) Patent No.: US 12,493,564 B2
(45) Date of Patent: Dec. 9, 2025

(54) MEMORY DEDUPLICATION FOR ENCRYPTED VIRTUAL MACHINES

(71) Applicant: RED HAT, INC., Raleigh, NC (US)

(72) Inventors: Michael Tsirkin, Yokneam (IL); Andrea Arcangeli, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 360 days.

(21) Appl. No.: 17/947,840

(22) Filed: Sep. 19, 2022

(65) Prior Publication Data
US 2024/0095188 A1    Mar. 21, 2024

(51) Int. Cl.
*H04L 9/00*    (2022.01)
*G06F 9/455*    (2018.01)
*G06F 12/14*    (2006.01)

(52) U.S. Cl.
CPC ...... *G06F 12/1408* (2013.01); *G06F 9/45558* (2013.01); *G06F 2009/45583* (2013.01); *G06F 2009/45587* (2013.01); *G06F 2212/1052* (2013.01)

(58) Field of Classification Search
CPC ............. G06F 12/1408; G06F 9/45558; G06F 2009/45583; G06F 2009/45587; G06F 2212/1052; G06F 2212/1004; G06F 2212/254; G06F 2212/657; G06F 12/10; G06F 2212/656; G06F 12/109; G06F 12/1441; G06F 2212/152

See application file for complete search history.

(56) References Cited

U.S. PATENT DOCUMENTS

| | | | |
|---|---|---|---|
| 10,261,820 B2 | 4/2019 | Tsirkin et al. | |
| 10,509,733 B2 | 12/2019 | Tsirkin et al. | |
| 11,232,030 B2 | 1/2022 | Tsirkin | |
| 11,341,099 B1* | 5/2022 | Wolfson | G06F 9/45558 |

(Continued)

OTHER PUBLICATIONS

Joy et al., "Secure Deduplication for Cloud Storage Using Memory Mapping Technique for Improving Performance and Security," Journal of University of Shanghai for Science and Technology, vol. 23(9), Sep. 2021: pp. 1-13.

(Continued)

*Primary Examiner* — Fatoumata Traore
(74) *Attorney, Agent, or Firm* — Kilpatrick Townsend & Stockton LLP

(57) ABSTRACT

Memory deduplication for encrypted virtual machines can be performed according to some examples. In one example, a virtual machine can select a target memory page stored in an encrypted memory of the virtual machine. The encrypted memory can be inaccessible to a hypervisor configured to manage the virtual machine. The virtual machine can store a copy of the target memory page to a shared memory that is accessible to the hypervisor. The hypervisor can then execute a deduplication process with respect to the copy of the target memory page stored in the shared memory. Subsequent to storing the copy of the target memory page to the shared memory, the virtual machine can remove the target memory page from the encrypted memory. The virtual machine can also prompt the hypervisor to reallocate the memory space of the encrypted memory that was previously used to store the target memory page.

20 Claims, 4 Drawing Sheets

(56) References Cited

U.S. PATENT DOCUMENTS

2016/0203313 A1* 7/2016 El-Moussa .............. G06F 21/57
                                                         726/23
2017/0024246 A1   1/2017 Gopalan
2017/0123710 A1   5/2017 Fisher
2017/0270176 A1*  9/2017 Horowitz ............ G06F 11/2097
2021/0089339 A1*  3/2021 Tsirkin ................ G06F 9/45558
2021/0096898 A1*  4/2021 Tsirkin .................... G06F 12/10
2021/0334206 A1* 10/2021 Colgrove .............. G06F 3/0638

OTHER PUBLICATIONS

Shaikh et al., "VMDedup: Memory De-duplication in Hypervisor," IEEE Computer Society, IEEE International Conference on Cloud Engineering, 2014: pp. 379-384.

* cited by examiner

MEMORY DEDUPLICATION FOR ENCRYPTED VIRTUAL MACHINES

TECHNICAL FIELD

The present disclosure relates generally to virtual machines. More specifically, but not by way of limitation, this disclosure relates to performing memory deduplication for encrypted virtual machines.

BACKGROUND

Virtual machines are one popular mechanism for deploying virtual computing environments on a physical computer system. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Examples of the guest software can include a guest operating system, a guest supervisory program, and one or more guest applications that may execute in userspace. Guest software is generally given limited access to the physical resources of the underlying host machine.

Virtual machines can be deployed on a host machine using a hypervisor. A hypervisor can be a software layer that sits below the virtual machines and above the physical hardware of the host machine. In some cases, the hypervisor can execute on top of an operating system running on the host machine. In other cases, the hypervisor can execute directly on the physical hardware without an operating system beneath it. Either way, the hypervisor can provide interfaces between the virtual machines and the underlying physical hardware of the host machine.

Memory of a host machine, and virtual machines running on the host machine, is typically divided into memory pages. In some host machines, the hypervisor reduces physical memory consumption by using memory deduplication techniques to reduce the amount of memory pages that store the same data. Memory deduplication improves memory utilization by detecting that two (or more) pages in memory are identical and removing one of the duplicate pages. In one instance, a first memory page may reside in a first virtual machine's memory space, and a second memory page may reside in a second virtual machine's memory space. If the first and second memory pages have the same content, the first memory page may be considered a duplicate of the second memory page and removed. In such an instance, a page table entry of the first virtual machine may be modified to point to the second memory page, and the first virtual machine may use the second memory page rather than the first memory page, thus improving the utilization of memory.

DETAILED DESCRIPTION

Figure 1:
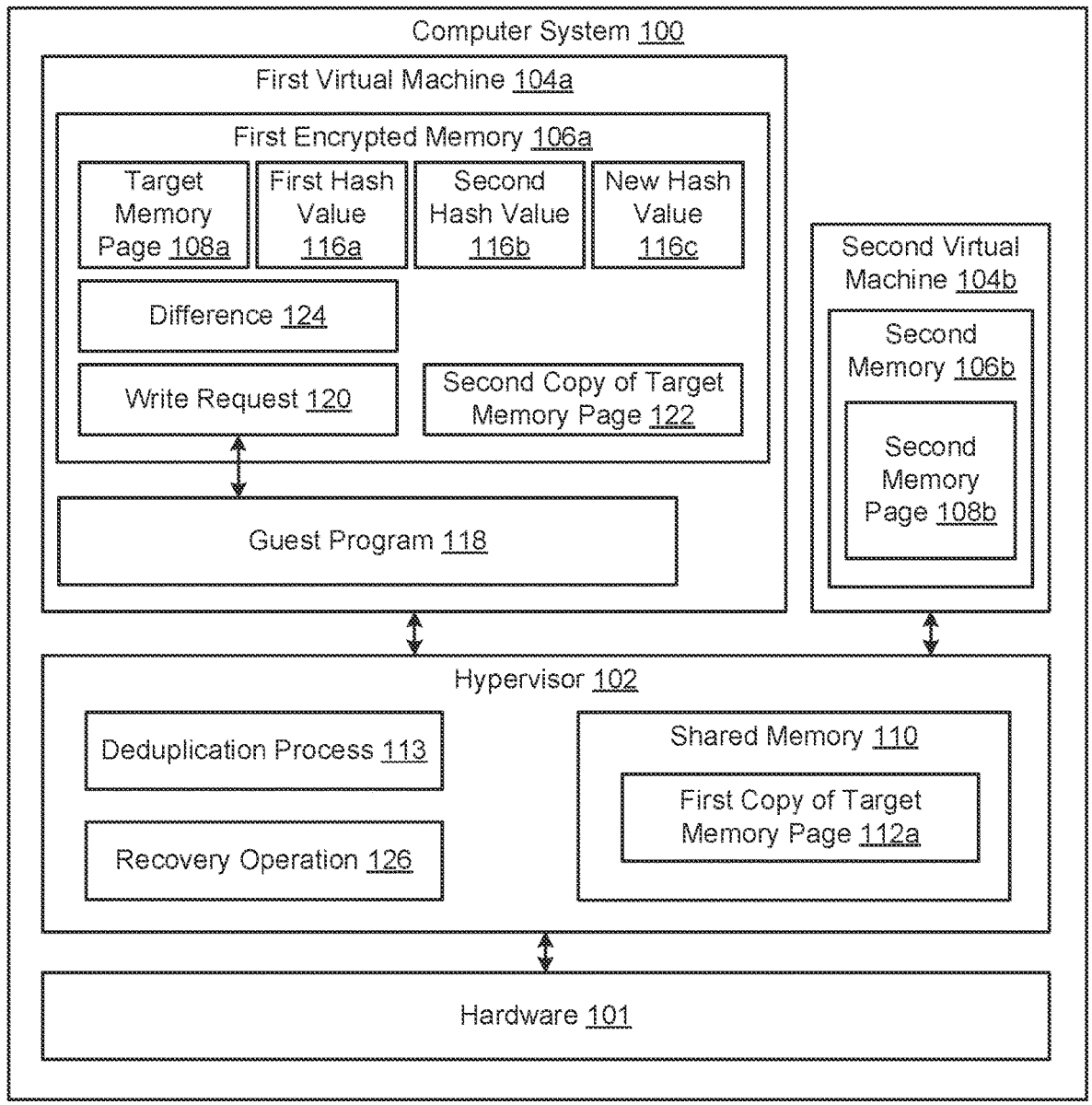
FIG. 1 shows a block diagram of an example of a computer system for performing memory deduplication for encrypted virtual machines according to some aspects of the present disclosure.

A physical computer system can include physical hardware running a hypervisor to manage a virtual machine. The virtual machine can include virtualized hardware that emulates the physical hardware. Examples of the virtualized hardware can include a virtual central processing unit (vCPU) or a virtualized storage device. The virtual machine's memory can be encrypted using cryptographic functions that may use variations in cryptographic input so that two instances of the same content, such as two memory pages storing the same content, appear different after they are encrypted. Having different encrypted versions of the same content may enhance security, but may also inhibit data deduplication techniques because it is more challenging to properly or efficiently detect duplicates in the underlying content.

Additionally, the virtual machine's memory may be encrypted using cryptographic functions implemented by a combination of hardware and lower-level code (e.g., firmware). The cryptographic functions may use cryptographic keys that are concealed from higher-level code, such as the hypervisor. When the hypervisor requests data associated with the virtual machine, the hardware typically does not decrypt the data before fulfilling the request for the data. For example, if the data is a memory page stored in an encrypted memory of a virtual machine, then a request from the hypervisor may be fulfilled with the encrypted version of the memory page. Conversely, a request by the guest software of the virtual machine may be fulfilled with a decrypted version of the memory page. And, even though the hypervisor manages the virtual machine, the hypervisor is normally prohibited from accessing the decrypted memory page. This can prevent the hypervisor from being able to access the underlying content of the memory page for deduplication purposes. As a result, the hypervisor may be unable to perform deduplication processes with respect to the virtual machine.

Some examples of the present disclosure can overcome one or more of the abovementioned problems by storing a decrypted copy of an encrypted memory page associated with a virtual machine to a shared memory that is accessible to the hypervisor. By storing the decrypted copy of the memory page in an accessible location, the hypervisor can then perform deduplication processes using the decrypted copy of the memory page. The original memory page can be removed from the encrypted memory of the virtual machine, reducing memory usage in the computer system. This technique can allow the hypervisor to perform deduplication processes on encrypted virtual machines to significantly reduce memory usage of the computing system. In some examples, as much as 30% of memory on an encrypted virtual machine can be deduplicated. Additionally, the virtual machine can indicate to the hypervisor that the memory space that was previously allocated to the target memory page is no longer in use. The hypervisor can then re-allocate that memory, which can improve performance of the computing system.

In one particular example, an encrypted virtual machine can identify a target memory page that can be safely decrypted. For example, the target memory page may be identified as a page that does not include sensitive data and is likely to be deduplicated, such as memory pages associated with the operating system of the virtual machine. The virtual machine can decrypt the target memory page and store a copy of the target memory page in a shared memory. The shared memory may not be encrypted and may be accessible by a hypervisor that manages the virtual machine. The virtual machine may then remove the target memory page from its encrypted memory to conserve memory. The virtual machine can also prompt the hypervisor to reallocate memory that was previously used for the target memory page, prior to its removal. With the copy of the target memory page now stored in the shared memory, the hypervisor can then perform a deduplication process to detect memory pages that match the copy of the target memory page. For example, a second virtual machine may also be managed by the hypervisor. The hypervisor can detect a second memory page associated with the second virtual machine is identical to the copy of the target memory page stored in the shared memory. After detecting the match, the hypervisor can remove the second memory page, because it is redundant, and update a page table. The page table can be updated so that references to the second memory page point to the existing copy of the target memory page in the shared memory.

In some examples, the target memory page may be restored to the encrypted memory of the virtual machine. For example, a guest program may request access to the target memory page. Because the target memory page no longer stored within the virtual machine, a guest fault is triggered rather than a hypervisor fault, and the contents of the target memory page may be restored to the virtual machine to fulfill the request. To ensure that the contents of the copy of the target memory page have remained unchanged by the hypervisor and match the original target memory page, the virtual machine can compare hashes of the target memory page at different points in time. More specifically, the virtual machine can determine a first hash value for the target memory page prior to storing the copy of the target memory page in the shared memory. Then at a later point in time, in response to the guest program requesting access to the target memory page, the virtual machine can determine a second hash value for the copy of the target memory page that is stored in the shared memory. The virtual machine can then compare to the first hash value to the second hash value. If the hash values match (e.g., are identical), then it can be assumed that the copy of the target memory page stored in the shared memory has not been modified by the hypervisor (e.g., that the target memory page has remained the same since it was stored in the shared memory). This may mean that it is safe for the virtual machine to use the copy of the target memory page stored in the shared memory. So, the target memory page can be copied from the shared memory to the encrypted memory of the virtual machine for use in fulfilling the request by the guest program. If the first hash value does not match the second hash value, this can indicate that the copy of the target memory page was modified by the hypervisor or another program. Because such a change may present security concerns, the system may not copy the target memory page from the share memory to the encrypted memory of the virtual machine. Rather, the hypervisor may shut down or reboot the guest program or the virtual machine. Additionally, or alternatively, the virtual machine or the hypervisor can perform a recovery operation to recover the original contents of the target memory page.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a computer system 100 for performing memory deduplication for encrypted virtual machines according to some aspects of the present disclosure. The computer system 100 may be a single host machine or multiple host machines that may be arranged in a homogeneous or non-homogeneous group (e.g., cluster system, grid system, or distributed system). Examples of the computer system 100 can include a rackmount server, a workstation, a desktop computer, a notebook computer, a tablet computer, a mobile phone, a palm-sized computing device, or a personal digital assistant (PDA).

The computer system 100 can include hardware 101. The hardware 101 can include physical devices such as processors and memory devices. The computer system 100 can also include a hypervisor 102. The hypervisor 102 may run directly on the hardware 101 of the computer system 100 (e.g., bare metal hypervisor), or may run on or within a host operating system (not shown). The hypervisor 102 can manage virtual machines 104*a-b* and can provide the virtual machines 104*a-b* with access to system resources. Each of the virtual machines 104*a-b* may be based on hardware emulation and may support para-virtualization, operating system-level virtualization, or a combination thereof.

The hypervisor 102 can be used to deploy the first virtual machine 104*a*. The first virtual machine 104*a* can provide a virtualized computing environment that includes virtualized hardware configured to emulate corresponding physical hardware, such as hardware 101. Examples of the virtualized hardware can include one or more central processing units (vCPUs), one or more virtual memory devices, and one or more virtual storage devices. The first virtual machine 104*a* can execute guest software which can be any suitable type of software. Examples of guest software can include a guest operating system, a guest supervisory program, or a guest program 118. A guest program 118 may execute in userspace and may have fewer privileges than a guest supervisory program or guest operating system.

In some examples, the first virtual machine 104*a* can be encrypted and can include a virtualized, first encrypted memory 106*a*. Because the first encrypted memory 106*a* is encrypted, the hypervisor 102 may generally be unable to access the contents of the first encrypted memory 106*a*. For example, the first encrypted memory 106*a* can include a target memory page 108*a*, which may be inaccessible to the hypervisor 102 by default. To facilitate deduplication, in some examples the first virtual machine 104*a* may identify one or more memory pages stored in the first encrypted memory 106 for sharing with the hypervisor 102. For example, the first virtual machine 104*a* can determine that the target memory page 108*a* is to be made accessible to the hypervisor 102.

The first virtual machine 104*a* can select one or more memory pages for sharing with the hypervisor 102 using any suitable technique. For example, the first virtual machine 104*a* may identify one or more memory pages associated with the common content (e.g., content that is often the same or similar among multiple virtual machines) for sharing with the hypervisor 102. This is because such memory pages may be more likely to match memory pages of other virtual machines and may therefore be ripe for deduplication. For example, memory pages storing an operating system of the first virtual machine 104a may be more likely to match memory pages storing an operating system of other virtual machines managed by the hypervisor 102. So, those memory pages may be good candidates to be shared with and deduplicated by the hypervisor 102 to reduce memory storage for the computer system 100. In some examples, the first virtual machine 104a may identify a single target memory page for sharing with the hypervisor 102. In other examples, the first virtual machine 104a may identify multiple target memory pages for sharing with the hypervisor 102. The first virtual machine 104a may also exclude certain memory pages from sharing with the hypervisor 102. For example, the first virtual machine 104a may exclude from sharing one or more memory pages that are designated as sensitive or private (e.g., private memory for programs), so that they are not potentially exposed to the hypervisor 102.

As noted above, the first virtual machine 104a can select the target memory page 108a for sharing with the hypervisor 102. But before sharing the target memory page 108a with the hypervisor 102, the first virtual machine 104a can determine a first hash value 116a of the contents of the target memory page 108a. The first hash value 116a can be stored in the first encrypted memory 106a and can be used to determine if subsequent copies of the target memory page 108a have been modified. In some examples, the first virtual machine 104a can determine the first hash value 116a of the contents of the target memory page 108a only. In other examples, the first virtual machine 104a can determine a first hash value 116a of a block of memory pages that includes the target memory page 108a. For example, the block of memory pages could include 512 memory pages.

After storing the first hash value 116a, the first virtual machine 104a can store a first copy of the target memory page 112a in a shared memory 110 that is accessible to the hypervisor 102. The first copy of the target memory page 112a may be a replica (e.g., an exact duplicate) of the target memory page 108a. The first virtual machine 104a can then remove the target memory page 108a from the first encrypted memory 106a, after the first copy of the target memory page 112 is stored in the shared memory 110. The hypervisor 102 can then perform a deduplication process 113 with respect to the first copy of the target memory page 112a. For example, the hypervisor 102 can scan the shared memory 110 and/or a second memory 106b of a second virtual machine 104b managed by the hypervisor 102 to identify memory pages that match (e.g., are identical or substantially identical to) the first copy of the target memory page 112a. For example, the hypervisor 102 may determine that the contents of the first copy of the target memory page 112a match the contents of a second memory page 108b, which is stored in the second memory 106b of the second virtual machine 104b. The hypervisor 102 may then deduplicate the matching memory pages by updating a page table to cause references for the second memory page 108b to point to the first copy of the target memory page 112a in the shared memory 110. The hypervisor 102 can then delete the second memory page 108b from the second memory 106b.

When a guest program 118 transmits a write request 120 to the target memory page 108a, the first virtual machine 104a may need access to the target memory page to fulfill the write request 120. To that end, the first copy of the target memory page 112a stored in shared memory 110 may be used to restore the target memory page 108a to the first encrypted memory 106a. This may involve copying the target memory page from the shared memory 110 to the first encrypted memory 106a. But if the copy of the target memory page 112a has changed in the interim period between when it was stored in the shared memory 110 and when it is needed by the guest program 118, it can create problems and potential security risks. For example, if the hypervisor 102 has been controlled by a malicious actor to modify the first copy of the target memory page 112a, or if the hypervisor 102 modifies the first copy of the target memory page 112a for other reasons, it can create security vulnerabilities and other problems. It may therefore be desirable to detect such modifications and take appropriate remedial action to prevent or resolve these problems.

To determine if the first copy of the target memory page 112a stored in the shared memory 110 matches the prior version of the target memory page 108a that was removed from the first encrypted memory 106a, the first virtual machine 104a can determine a second hash value 116b of the contents of the first copy of the target memory page 112a. If the first hash value 116a matches the second hash value 116b, the first virtual machine 104a can generate a second copy of the target memory page 122 based on the first copy of the target memory page 112a. The second copy of the target memory page 122 can be stored in the first encrypted memory 106a. The first virtual machine 104a can fulfill the write request 120 using the second copy of the target memory page 122, rather than using the first copy of the target memory page 112a in the shared memory 110. Because the first hash value 116a and the second hash value 116b match, the second copy of the target memory page 122 may be identical to the prior version of the target memory page 108a that was previously stored in the first encrypted memory 106a.

In some examples, the first virtual machine 104a may fulfill the write request 120 by modifying the second copy of the target memory page 122, which can generate a modified copy of the target memory page. Because of this change, the first hash value 116a may be outdated, because the first hash value 116a no longer accurately reflects the current content associated with the target memory page. To remedy this problem, the first virtual machine 104a can generate a new hash value 116c based on the modified copy of the target memory page. The new hash value 116c can be stored in the first encrypted memory 106a. If the first hash value 116a was based on a block of memory pages that included the target memory page 108a, the new hash value 116c can be based on the same block of pages, but including the modified copy of the target memory page rather than the original target memory page 108a. After creating the modified copy of the target memory page, it may then be stored in the shared memory 110 for deduplication. The new hash value 116c may be used as described above, for example to check if the modified copy of the target memory page has been further modified by the hypervisor 102.

If the first virtual machine 104a determines a difference 124 between the first hash value 116a and the second hash value 116b, this can indicate that the first copy of the target memory page 112a was modified. The first virtual machine 104a can therefore be prevented from generating the second copy of the target memory page 122 in the first encrypted memory 106a. In some examples, first virtual machine 104a may notify the hypervisor 102 of the mismatch, so that the hypervisor 102 can perform one or more remedial actions. For example, the hypervisor 102 may shut down or reboot the guest program 118 or the first virtual machine 104a. Additionally, or alternatively, the first virtual machine 104a or the hypervisor 102 may perform a recovery operation 126 to obtain the original version of the target memory page 108a. For example, the hypervisor 102 may read the original version of the target memory page 108a from the disk in the hardware 101. In some examples, the hypervisor 102 may have automatically stored (e.g., during a backup operation) an un-modified version of the first copy of the target memory page 112a. In such examples, the un-modified version of the first copy of the target memory page 112a can be accessed to restore the original version of the target memory page 108a.

Although FIG. 1 shows a particular number and combination of components, this is intended to be illustrative and non-limiting. Other examples may include more components, fewer components, different components, or a different combination of components than is shown in FIG. 1. For example, although the computer system 100 of FIG. 1 includes one guest application and two virtual machines with two memory pages for simplicity, the computer system 100 may include any number of guest applications, virtual machines, and memory pages in other examples.

Figure 2:
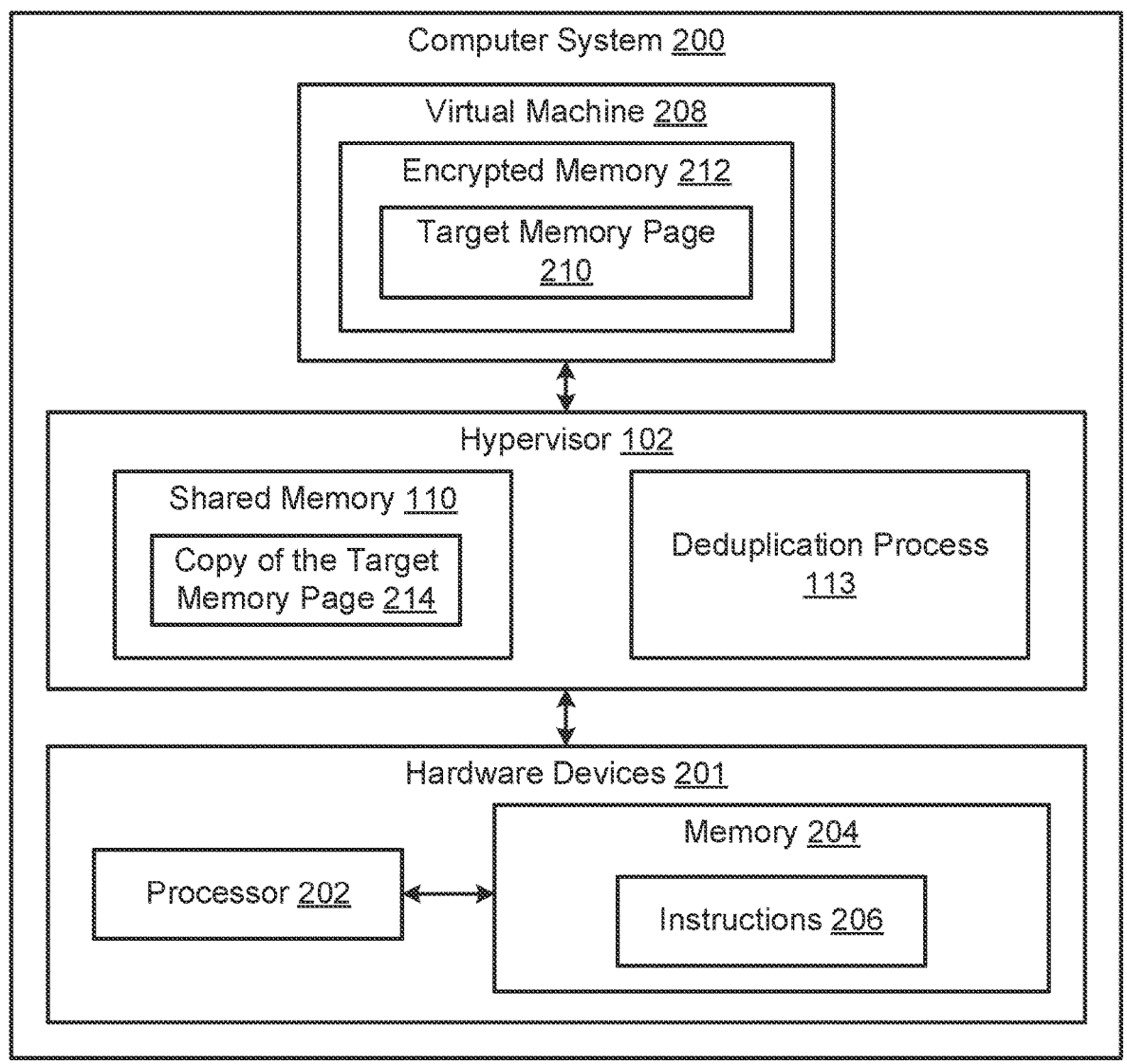
FIG. 2 shows a block diagram of another example of a computer system for performing memory deduplication for encrypted virtual machines according to some aspects of the present disclosure.

FIG. 2 shows a block diagram of another example of a computer system 200 for performing memory deduplication for encrypted virtual machines according to some aspects of the present disclosure. The computer system 200 includes hardware devices 201 including a processor 202 that is communicatively coupled to a memory 204. In some examples, the processor 202 and the memory 204 can be part of the same computing device. In other examples, the processor 202 and the memory 204 can be distributed from (e.g., remote to) one another.

The processor 202 can include one processor or multiple processors. Examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C #, and Java.

The memory 204 can include one memory or multiple memories. The memory 204 can be volatile or non-volatile (e.g., it can retain stored information when powered off). Examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Examples of computer-readable mediums include magnetic disks, memory chips, ROM, random-access memory (RAM), an ASIC, a configured processor, optical storage, or any other medium from which a computer processor can read the instructions 206.

The processor 202 can execute the instructions 206 to perform operations. For example, the processor 202 can execute a hypervisor 102 that can manage a virtual machine 208. The virtual machine 208 to select a target memory page 210 stored in an encrypted memory 212 of the virtual machine 208. The encrypted memory 212 may be inaccessible to the hypervisor 102. The virtual machine 208 can store a copy of the target memory page 214 to a shared memory 110 that is accessible to the hypervisor 102. The hypervisor 102 can execute a deduplication process 113 with respect to the copy of the target memory page 214 stored in the shared memory 110. Subsequent to storing the copy of the target memory page 214 to the shared memory 110, the virtual machine 208 can remove the target memory page 210 from the encrypted memory 212. Subsequent to removing the target memory page 210 from the encrypted memory 212, the virtual machine 208 can prompt the hypervisor 102 to reallocate memory used for the target memory page 210.

Figure 3:
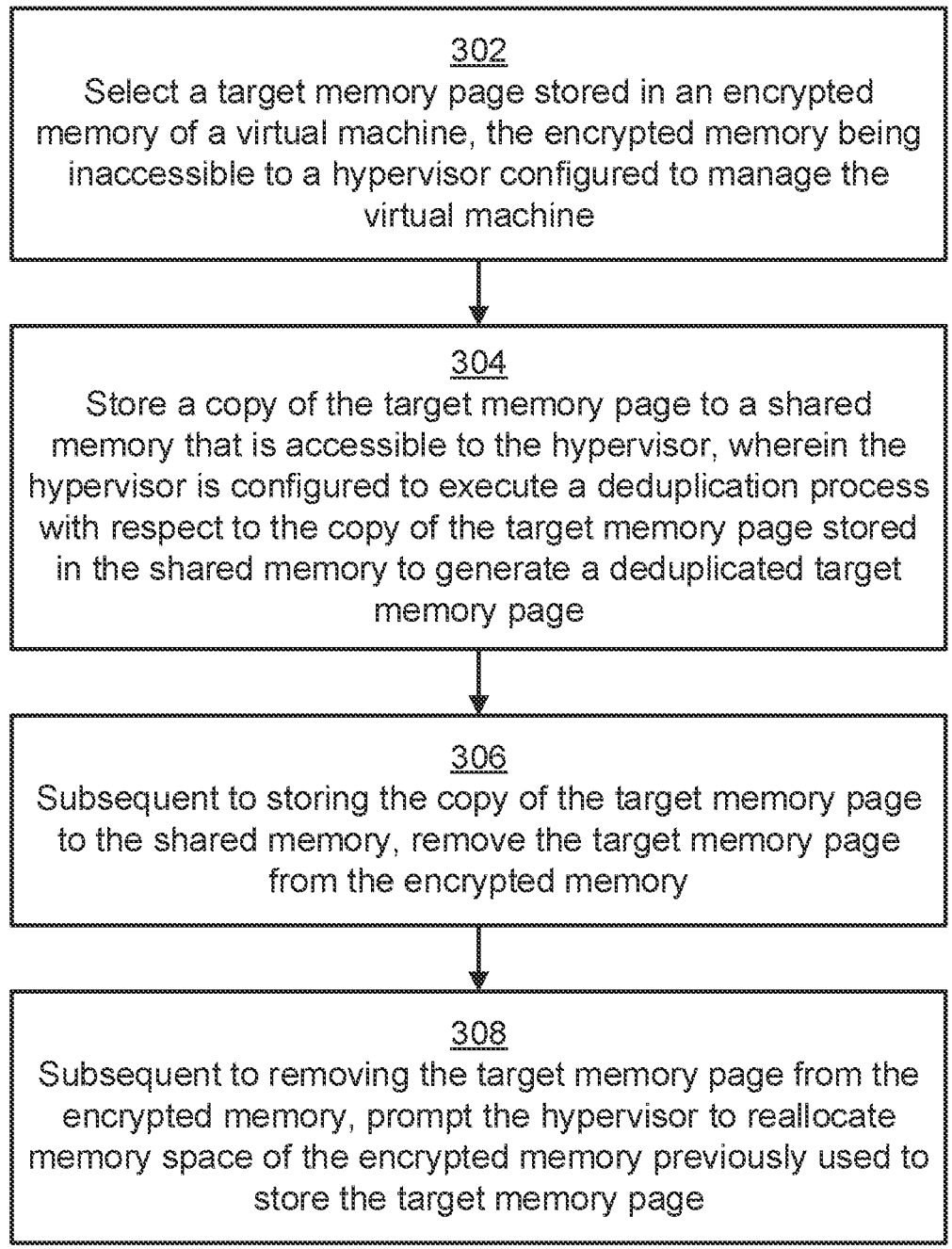
FIG. 3 is a flow chart of an example of a process for performing memory deduplication for encrypted virtual machines according to some aspects of the present disclosure.
Figure 4:
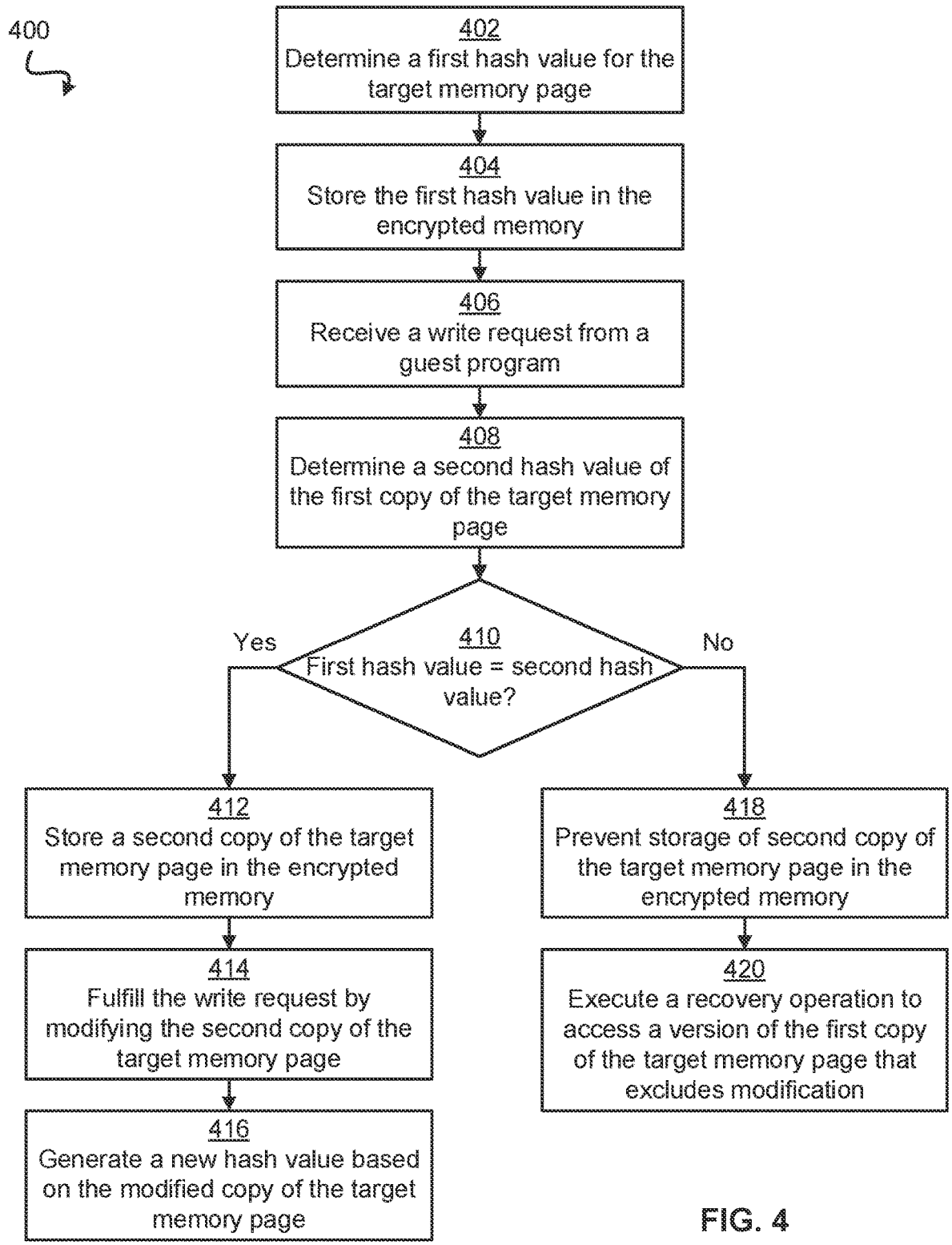
FIG. 4 is a flow chart of an example of a process for restoring memory pages to encrypted virtual machines according to some aspects of the present disclosure.

In some examples, the software executing on the processor 202 can implement some or all of the steps shown in FIGS. 3-4. Other examples may involve more steps, fewer steps, different steps, or a different order of the steps than is shown in FIGS. 3-4. The steps of FIGS. 3-4 are described below with reference to components described above with regard to FIGS. 1-2.

Turning to FIG. 3, at block 302, the virtual machine 208 can select a target memory page 210 stored in an encrypted memory 212 of the virtual machine 208, the encrypted memory 212 being inaccessible to a hypervisor 102 configured to manage the virtual machine 208. The target memory page 210 can be a memory page that does not include sensitive or private data. For example, the virtual machine 208 can identify a target memory page 210 that is an executable page for public binaries. In another example, the virtual machine 208 may identify a target memory page 210 that excludes private memory of guest programs 118 running on the virtual machine 208.

At block 304, the virtual machine 208 can store a copy of the target memory page 214 to a shared memory 110 that is accessible to the hypervisor 102. The hypervisor 102 can be configured to execute a deduplication process 113 with respect to the copy of the target memory page 214 stored in the shared memory 110. The virtual machine 208 may decrypt the target memory page 214 before storing the copy of the target memory page 214 to the shared memory 110. The copy of the target memory page 214 can be identical to the target memory page 210.

Because the hypervisor 102 can access the shared memory 110, the hypervisor 102 can perform the deduplication process 113 by scanning the computer system 200 for memory pages that are identical or substantially identical to the copy of the target memory page 214. For example, the hypervisor 102 may detect that a second memory page 108b stored in a second memory 106b of a second virtual machine 104b managed by the hypervisor 102 matches the copy of the target memory page 214. Based on the match, the hypervisor 102 may remove the second memory page 108b and update a page table to cause references to the second memory page 108b to point to the copy of the target memory page 214. Alternatively, the hypervisor 102 may remove the copy of the target memory page 214, and may update the page table to cause references to the copy of the target memory page 214 to point to the second memory page 108b.

At block 306, subsequent to storing the copy of the target memory page 214 to the shared memory 110, the virtual machine 208 can remove the target memory page 210 from the encrypted memory 212. Removing the target memory page 210 from the encrypted memory 212 may free up memory for the virtual machine 208.

The copy of the target memory page 214 can be stored in the shared memory 110 until an event occurs (e.g., a condition is met), for example until the virtual machine 208 needs to access the target memory page. In response to detecting the event, the target memory page 214 can be copied from the shared memory 110 back to the virtual machine's 208 private memory and removed from the shared memory 110. This is described in further detail in FIG. 4.

At block 308, the virtual machine 208 can prompt the hypervisor 102 to reallocate memory space of the encrypted memory 212 previously used to store the target memory page 214 subsequent to removing the target memory page 214 from the encrypted memory 212. For example, the virtual machine 208 may transmit a notification (e.g., a hint) to the hypervisor 102 indicating that memory space previously allocated for the target memory page 214 has been freed up. The notification can identify the memory space, for example using a block address or another type of memory address. In response to receiving the notification, the hypervisor 102 may de-allocate the memory for the target memory page 214 from the virtual machine 208. The de-allocated memory may be reallocated by the hypervisor 102, for example to the same virtual machine 208 or another virtual machine. In some examples, the hypervisor 102 can reallocate the memory space back to the virtual machine 208 later on, for example if the target memory page is to be copied from the shared memory 110 back to the encrypted memory 212 of the virtual machine 208.

Turning now to FIG. 4, at block 402, the virtual machine 208 can determine a first hash value 116a for the target memory page 210. The virtual machine 208 can determine the first hash value 116a before a first copy of the target memory page 112a is stored in shared memory 110. In one example, the first hash value 116a can be generated using any suitable cryptographic hashing algorithm. For example, the first hash value 116a can be a cryptographic Message Authentication Code (MAC) of the target memory page 210. The MAC can be generated using a Secure Hash Algorithm (SHA), which can include a salt value to protect against cyber security attacks. If the virtual machine 208 has identified multiple target memory pages, the first hash value 116a can be a combination of MACs for each memory page.

At block 404, the virtual machine 208 can store the first hash value 116a in the encrypted memory 212. After storing the first hash value 116a in the encrypted memory 212, the virtual machine 208 can remove the target memory page 210 from the encrypted memory 212, store a first copy of the target memory page 112a in shared memory 110, and perform a deduplication process 113 with respect to the first copy of the target memory page 112a.

At block 406, the virtual machine 208 can receive a write request 120 from a guest program 118 for the target memory page 210. But the virtual machine 208 may no longer store the target memory page 210, because the target memory page 210 was previously removed after being copied to the shared memory 110. Therefore, the target memory page 210 must be restored to the encrypted memory 212 before the write request 120 can be fulfilled by the virtual machine 208.

At block 408, the virtual machine 208 can determine a second hash value 116b of the first copy of the target memory page 112a stored in the shared memory 110. The virtual machine 208 can use the same techniques in determining the second hash value 116b as were used in determining the first hash value 116a. This can ensure that matching content between the pages will produce the same hash value.

At block 410, the virtual machine 208 can compare the first hash value 116a to the second hash value 116b. If the first hash value 116a matches the second hash value 116b (e.g., has an identical value, indicating that the contents of the first copy of the target memory page 112a are identical to the contents of the target memory page 210), then the process 400 continues to block 412. If the first hash value 116a does not match the second hash value 116b (e.g., does not have an identical value, indicating that the contents of the first copy of the target memory page 112a are not identical to the contents of the target memory page 210), the process 400 continues to block 418.

At block 412, the virtual machine 208 can store a second copy of the target memory page 122 in the encrypted memory 212. The second copy of the target memory page 122 can be generated based on the first copy of the target memory page 112a. Because the second copy of the target memory page 122 is identical to the original target memory page 210, the virtual machine 208 can use the second copy of the target memory page 122 to fulfill the write request 120.

At block 414, the virtual machine 208 can fulfill the write request 120 by modifying the second copy of the target memory page 122, thereby generating a modified second copy of the target memory page 122 that differs from the original target memory page 210.

At block 416, the virtual machine 208 can generate a new hash value 116c based on the modified second copy of the target memory page 122. After generating the new hash value 116c, the virtual machine 208 can share the modified second copy of the target memory page 122 with the hypervisor 102 for deduplication using the same process described in FIGS. 3-4. For example, the virtual machine 208 can store the second copy of the target memory page 122 to the shared memory 110. The virtual machine 208 can remove the second copy of the target memory page 122 from the encrypted memory 212. The hypervisor 102 can then perform the deduplication process 113 with respect to the second copy of the target memory page 122. The virtual machine 208 can also restore the contents of the second copy of the target memory page 122 to the encrypted memory 212. For example, the virtual machine 208 can do so after determining that a hash value of the second copy of the target memory page 122 (stored in the shared memory 110) matches the new hash value 116c stored in the encrypted memory 212.

At block 418, the virtual machine 208 can prevent the target memory memory 212 because the first hash value 116a does not match the second hash value 116b. This can indicate that the first copy of the target memory page 112a in the shared memory 110 includes a modification. In some examples, the hypervisor 102 may shut down the virtual machine 208 or the guest program 118 to prevent storage of the second copy of the target memory page 122.

At block 420, the virtual machine 208 or the hypervisor 102 can execute a recovery operation 126 to access a version of the first copy of the target memory page 112a that excludes modification. The version of the first copy of the target memory page 112a that excludes modification may be identical to the target memory page 210 that was originally stored in the encrypted memory 212. In some examples, the hypervisor 102 may have previously stored an original version of the first copy of the target memory page 112a before modifying the first copy of the target memory page 112a. The recovery operation 126 can include identifying the original version of the target memory page stored by the hypervisor 102. The virtual machine 208 can use the identified version to restore the target memory page 210 in its original version to the encrypted memory 212 for use in fulfilling the write request 120.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A non-transitory computer-readable medium comprising program code that is executable by a processor for causing a virtual machine to:
    select a target memory page stored in an encrypted format in an encrypted memory of the virtual machine, the encrypted memory being inaccessible to a hypervisor configured to manage the virtual machine;
    store an unencrypted copy of the target memory page to a shared memory that is accessible to the hypervisor, wherein the hypervisor is configured to execute a deduplication process with respect to the unencrypted copy of the target memory page stored in the shared memory, and wherein the deduplication process executed by the hypervisor involves comparing the unencrypted copy of the target memory page stored in the shared memory to an unencrypted copy of another memory page to determine whether the target memory page is duplicative of the other memory page;
    subsequent to storing the unencrypted copy of the target memory page to the shared memory, remove the target memory page from the encrypted memory; and
    subsequent to removing the target memory page from the encrypted memory, prompt the hypervisor to reallocate memory space of the encrypted memory previously used to store the target memory page.

2. The non-transitory computer-readable medium of claim 1, further comprising program code that is executable by the processor for causing the virtual machine to:
    prior to storing the unencrypted copy of the target memory page to the shared memory, determine a first hash value for the target memory page in the encrypted memory; and
    store the first hash value in the encrypted memory.

3. The non-transitory computer-readable medium of claim 2, further comprising program code that is executable by the processor for causing the virtual machine to, after the target memory page was removed from the encrypted memory:
    receive, from a guest program, a write request configured to modify the target memory page;
    in response to receiving the write request, determine a second hash value of the unencrypted copy of the target memory page stored in the shared memory; and
    compare the second hash value to the first hash value stored in the encrypted memory.

4. The non-transitory computer-readable medium of claim 3, further comprising program code that is executable by the processor for causing the virtual machine to, in response to comparing the second hash value to the first hash value:
    determine that the second hash value matches the first hash value;
    in response to determining that the second hash value matches the first hash value, store an encrypted copy of the target memory page in the encrypted memory of the virtual machine, the encrypted copy of the target memory page being generated based on the unencrypted copy of the target memory page in the shared memory; and
    fulfill the write request using the encrypted copy of the target memory page in the encrypted memory rather than the unencrypted copy of the target memory page in the shared memory.

5. The non-transitory computer-readable medium of claim 4, further comprising program code that is executable by the processor for causing the virtual machine to:
    fulfill the write request by modifying the encrypted copy of the target memory page in the encrypted memory to generate a modified copy of the target memory page;
    subsequent to modifying the encrypted copy of the target memory page, generate a new hash value based on the modified copy of the target memory page; and
    store the new hash value in the encrypted memory of the virtual machine.

6. The non-transitory computer-readable medium of claim 3, further comprising program code that is executable by the processor for causing the virtual machine to, in response to comparing the second hash value to the first hash value:
    determine that the first hash value does not match the second hash value, which indicates that a modification was made to the unencrypted copy of the target memory page in the shared memory; and
    in response to determining that the first hash value does not match the second hash value:
        forego storing an encrypted copy of the target memory page in the encrypted memory; and
        execute a recovery operation to access a version of the unencrypted copy of the target memory page that excludes the modification.

7. The non-transitory computer-readable medium of claim 1, wherein the virtual machine is a first virtual machine, and further comprising program code that is executable by the processor for causing the processor to:
    determine that the target memory page for the first virtual machine matches a second memory page stored in a second memory for a second virtual machine that is also managed by the hypervisor, wherein the hypervisor is configured to execute the deduplication process with respect to the target memory page and the second memory page based on the match.

8. The non-transitory computer-readable medium of claim 1, further comprising program code that is executable by the processor for causing the virtual machine to:
    determine whether the target memory page includes sensitive data; and
    in response to determining that the target memory page does not include sensitive data, store the unencrypted copy of the target memory page to the shared memory.

9. A method comprising:
    selecting, by a virtual machine executing on a processor, a target memory page stored in an encrypted format in an encrypted memory of the virtual machine, the encrypted memory being inaccessible to a hypervisor configured to manage the virtual machine;
    storing, by the virtual machine, an unencrypted copy of the target memory page to a shared memory that is accessible to the hypervisor;
    executing, by the hypervisor, a deduplication process with respect to the unencrypted copy of the target memory page stored in the shared memory, wherein the deduplication process executed by the hypervisor involves comparing the unencrypted copy of the target memory page stored in the shared memory to an unencrypted copy of another memory page to determine whether the target memory page is duplicative of the other memory page;

subsequent to storing the unencrypted copy of the target memory page to the shared memory, removing, by the virtual machine, the target memory page from the encrypted memory; and subsequent to removing the target memory page from the encrypted memory, prompting the hypervisor to reallocate memory space of the encrypted memory previously used to store the target memory page.

10. The method of claim 9, further comprising:

prior to storing the unencrypted copy of the target memory page to the shared memory, determining a first hash value for the target memory page in the encrypted memory; and storing the first hash value in the encrypted memory.

11. The method of claim 10, further comprising, after the target memory page was removed from the encrypted memory:

receiving, from a guest program, a write request configured to modify the target memory page;

in response to receiving the write request, determining a second hash value of the unencrypted copy of the target memory page stored in the shared memory; and comparing the second hash value to the first hash value stored in the encrypted memory.

12. The method of claim 11, further comprising, in response to comparing the second hash value to the first hash value:

determining that the second hash value matches the first hash value;

in response to determining that the second hash value matches the first hash value, storing an encrypted copy of the target memory page in the encrypted memory of the virtual machine, the encrypted copy of the target memory page being generated based on the unencrypted copy of the target memory page in the shared memory; and fulfilling the write request using the encrypted copy of the target memory page in the encrypted memory rather than the unencrypted copy of the target memory page in the shared memory.

13. The method of claim 12, further comprising:

fulfilling the write request by modifying the encrypted copy of the target memory page in the encrypted memory to generate a modified copy of the target memory page;

subsequent to modifying the encrypted copy of the target memory page, generating a new hash value based on the modified copy of the target memory page; and storing the new hash value in the encrypted memory of the virtual machine.

14. The method of claim 11, further comprising, in response to comparing the second hash value to the first hash value:

determining that the first hash value does not match the second hash value, which indicates that a modification was made to the unencrypted copy of the target memory page in the shared memory; and in response to determining that the first hash value does not match the second hash value:

foregoing storing an encrypted copy of the target memory page in the encrypted memory; and executing a recovery operation to access a version of the unencrypted copy of the target memory page that excludes the modification.

15. A system comprising:

a processor; and a non-transitory computer-readable memory comprising instructions that are executable by the processor for causing the processor to:

select, by a virtual machine, a target memory page stored in an encrypted format in an encrypted memory of the virtual machine, the encrypted memory being inaccessible to a hypervisor configured to manage the virtual machine;

store, by the virtual machine, an unencrypted copy of the target memory page to a shared memory that is accessible to the hypervisor;

execute, by the hypervisor, a deduplication process with respect to the unencrypted copy of the target memory page stored in the shared memory, wherein the deduplication process executed by the hypervisor involves comparing the unencrypted copy of the target memory page stored in the shared memory to an unencrypted copy of another memory page to determine whether the target memory page is duplicative of the other memory page;

subsequent to storing the unencrypted copy of the target memory page to the shared memory, remove, by the virtual machine, the target memory page from the encrypted memory; and subsequent to removing the target memory page from the encrypted memory, prompt, by the virtual machine, the hypervisor to reallocate memory space of the encrypted memory previously used to store the target memory page.

16. The system of claim 15, wherein the memory further comprises instructions that are executable by the processor for causing the virtual machine to:

prior to storing the unencrypted copy of the target memory page to the shared memory, determine a first hash value for the target memory page in the encrypted memory; and store the first hash value in the encrypted memory.

17. The system of claim 16, wherein the memory further comprises instructions that are executable by the processor for causing the virtual machine to, after the target memory page was removed from the encrypted memory:

receive, from a guest program, a write request configured to modify the target memory page;

in response to receiving the write request, determine a second hash value of the unencrypted copy of the target memory page stored in the shared memory; and compare the second hash value to the first hash value stored in the encrypted memory.

18. The system of claim 17, wherein the memory further comprises instructions that are executable by the processor for causing the virtual machine to, in response to comparing the second hash value to the first hash value:

determine that the second hash value matches the first hash value;

in response to determining that the second hash value matches the first hash value, store an encrypted copy of the target memory page in the encrypted memory of the virtual machine, the encrypted copy of the target memory page being generated based on the unencrypted copy of the target memory page in the shared memory; and fulfill the write request using the encrypted copy of the target memory page in the encrypted memory rather than the unencrypted copy of the target memory page in the shared memory.

19. The system of claim 18, wherein the memory further comprises instructions that are executable by the processor for causing the virtual machine to:
- fulfill the write request by modifying the encrypted copy of the target memory page in the encrypted memory to generate a modified copy of the target memory page;
- subsequent to modifying the encrypted copy of the target memory page, generate a new hash value based on the modified copy of the target memory page; and
- store the new hash value in the encrypted memory of the virtual machine.

20. The system of claim 17, wherein the memory further comprises instructions that are executable by the processor for causing the virtual machine to, in response to comparing the second hash value to the first hash value:
- determine that the first hash value does not match the second hash value, which indicates that a modification was made to the unencrypted copy of the target memory page in the shared memory; and
- in response to determining that the first hash value does not match the second hash value:
  - prevent an encrypted copy of the target memory page from being stored in the encrypted memory; and
  - execute a recovery operation to access a version of the unencrypted copy of the target memory page that excludes the modification.

\* \* \* \* \*